April 15, 1924. 1,490,270
F. HEBDEN
AUTOMATIC WEIGHER
Filed May 7, 1917 6 Sheets-Sheet 5
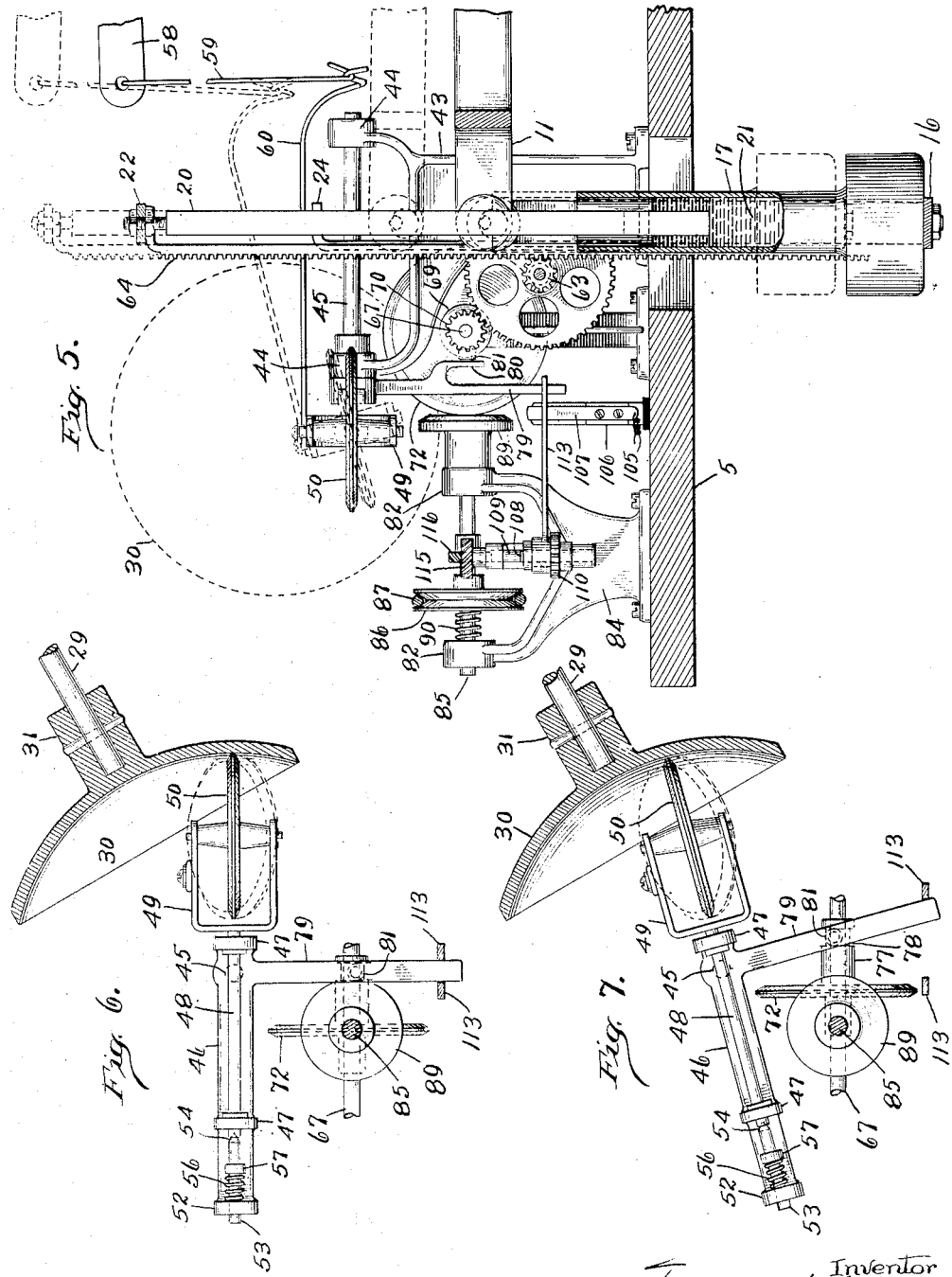

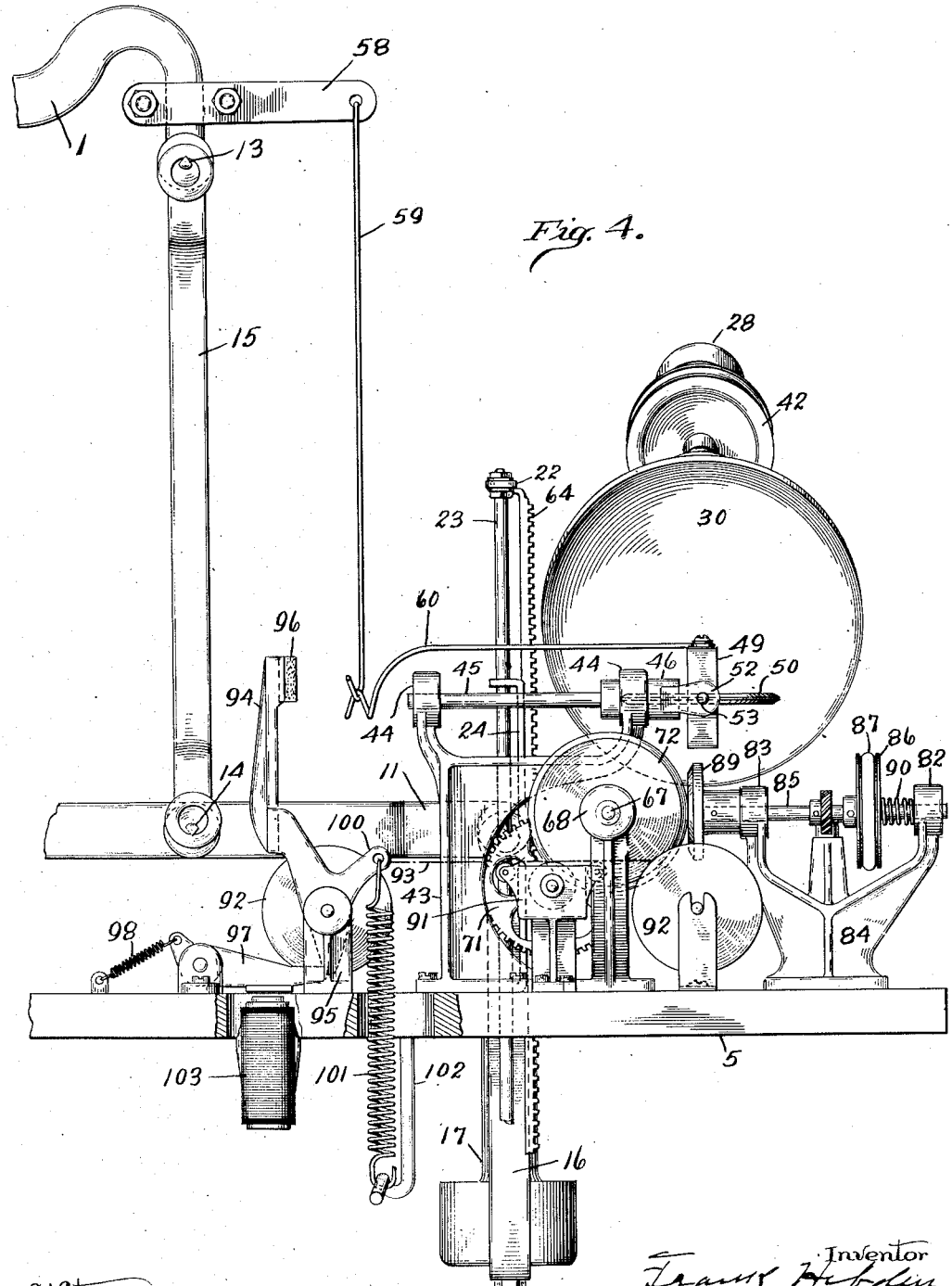

April 15, 1924.                                                                    1,490,270
F. HEBDEN
AUTOMATIC WEIGHER
Filed May 7, 1917                               6 Sheets-Sheet 6
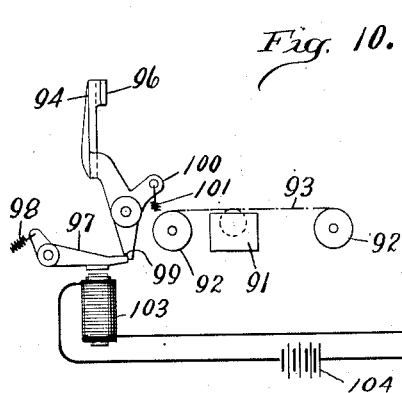
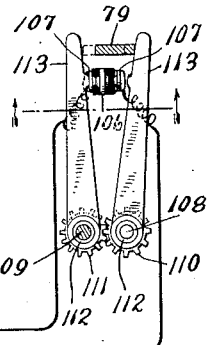
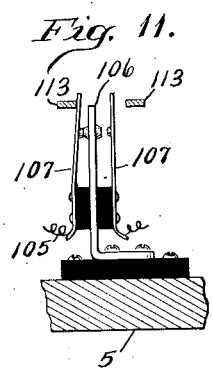
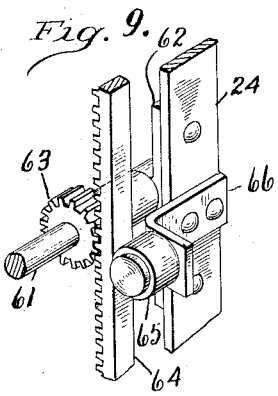
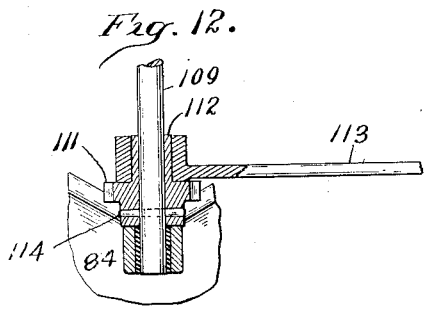
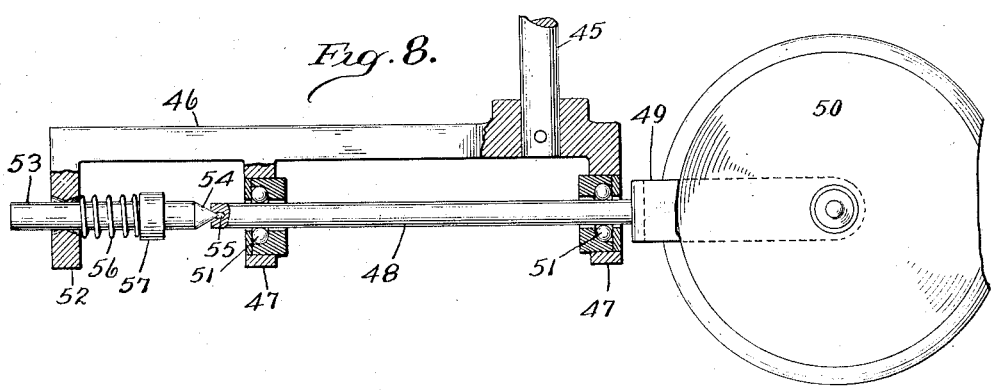

Patented Apr. 15, 1924.

1,490,270

UNITED STATES PATENT OFFICE.

FRANK HEBDEN, OF CHICAGO, ILLINOIS.

AUTOMATIC WEIGHER.

REISSUED
JUL 5 1927

Application filed May 7, 1917. Serial No. 166,804.

*To all whom it may concern:*

Be it known that I, FRANK HEBDEN, a citizen of the United States, residing at Chicago, in the county of Cook and State of Illinois, have invented certain new and useful Improvements in Automatic Weighers, of which the following is a specification.

This invention has reference more particularly to measuring devices in which means is provided for automatically determining the measurement, and also having mechanism co-operating therewith which indicates or registers the correct measurement.

The object of the invention is to provide mechanism which may readily be applied to the ordinary or standard forms of measuring devices for the purpose of automatically determining the measurement.

Another object is the provision of means which will have the effect of applying a variable weight to a measuring part such as the outer end of a scale beam for the purpose of balancing the scale beam with or without the load, such means being so constructed to effect a variable application of weight upon the scale beam with the friction thereof minimized to such a degree that it will not affect the accuracy of the scale whatsoever.

A further object is the provision of power driven means for operating the aforesaid balancing mechanism and means for controlling the said power driven means, whereby the balancing means is adjusted thereby until a correct balance and, therefore, a correct measurement is obtained.

A further object is the construction of power driven counter-balancing mechanism with controlling means therefor which is so easily operated that it does not effect the accuracy of the measuring device.

A further object is the provision of registering or indicating means and controlling means therefor which prevent the taking of a reading of the measurement unless the load is accurately balanced.

This invention also has other objects and features of improvement which are clearly shown in the following specification taken in connection with the accompanying drawings and which are particularly pointed out in the claims.

Referring to the drawings.

Figure 1:
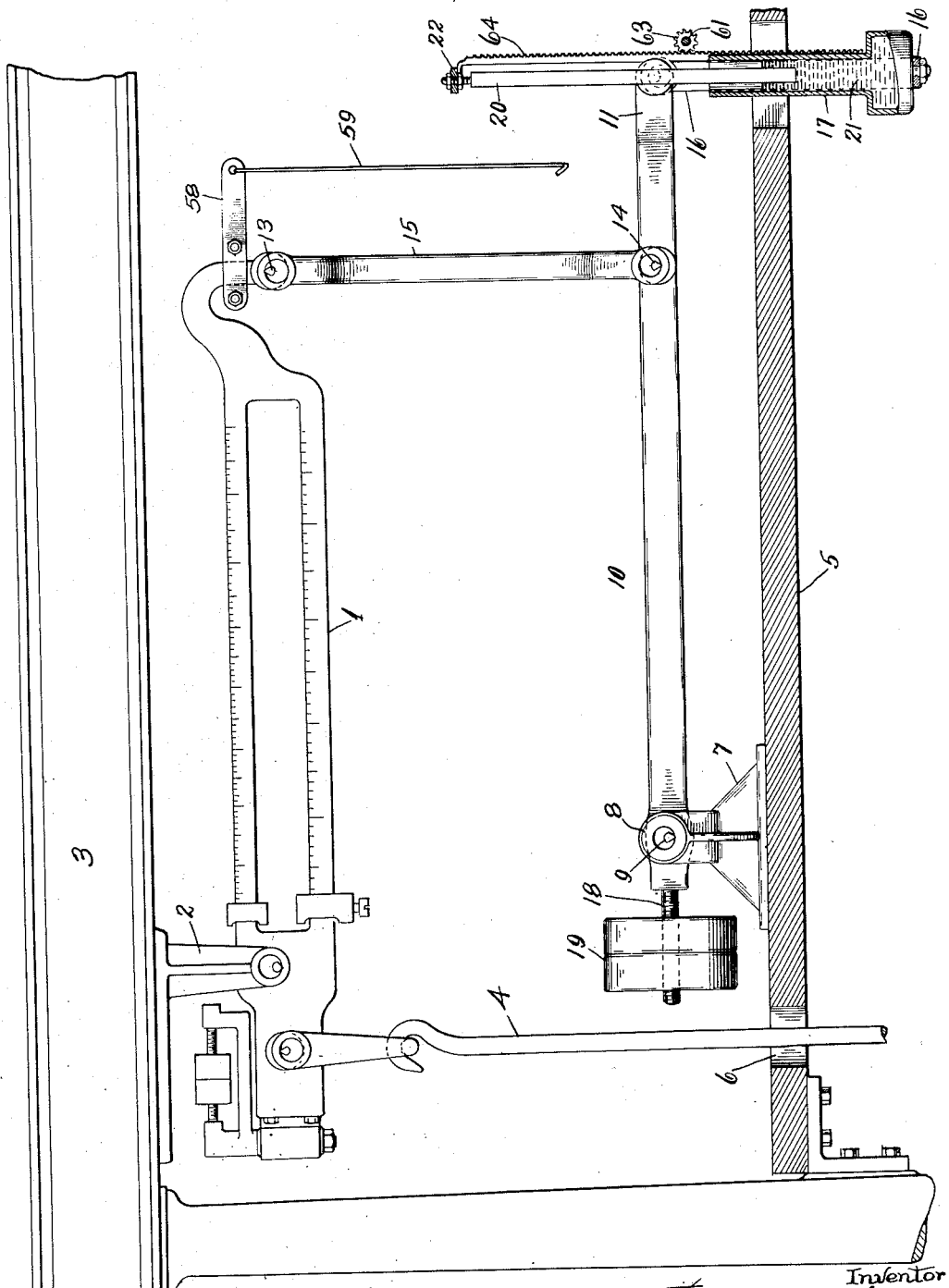
Fig. 1 represents a standard scale beam and supporting parts, therefor, of the usual weighing mechanism and shows parts of my invention which are immediately connected thereto.
Figure 2:
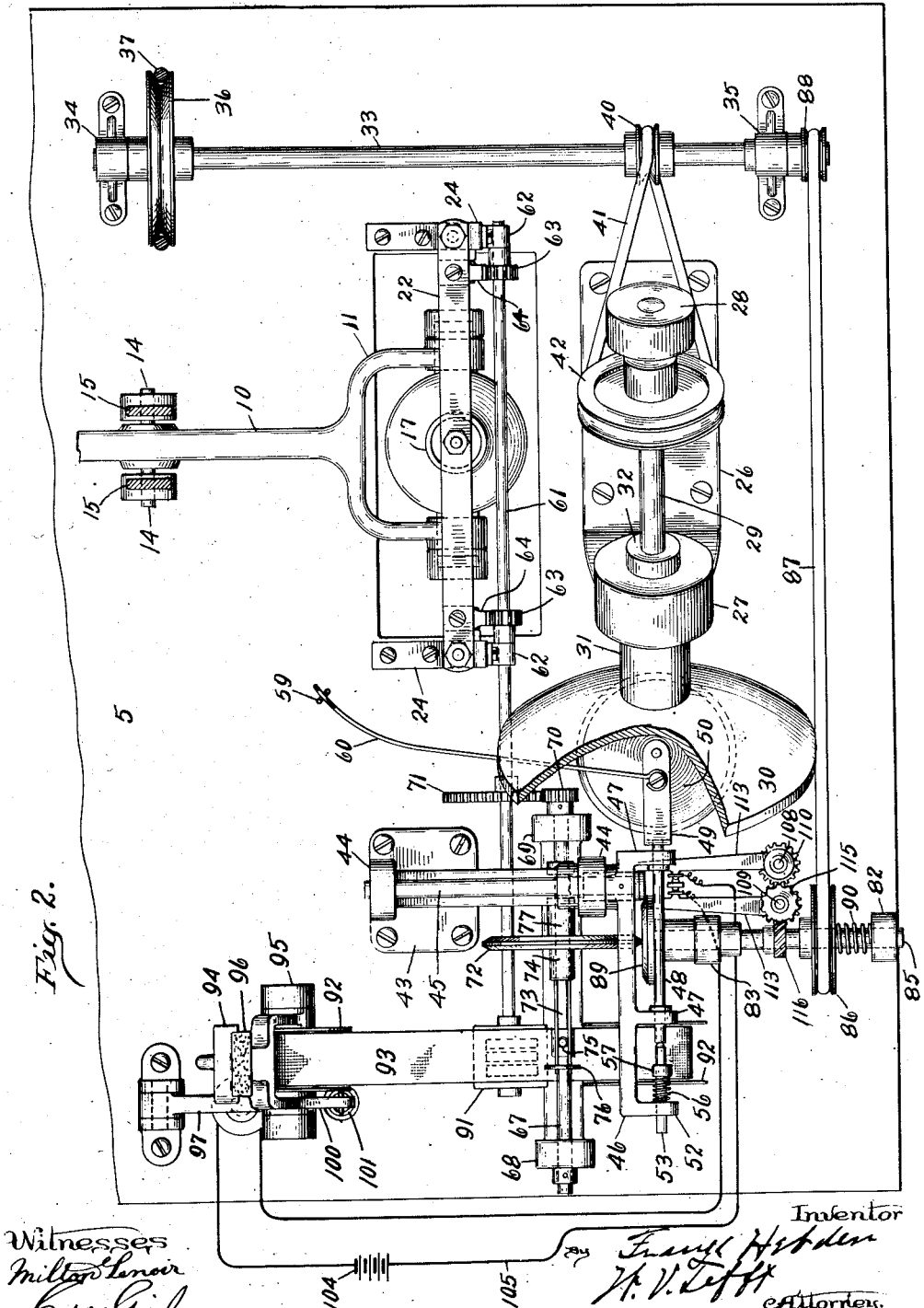
Fig. 2 is a top or plan view of the automatic weighing and registering mechanism.
Figure 3:
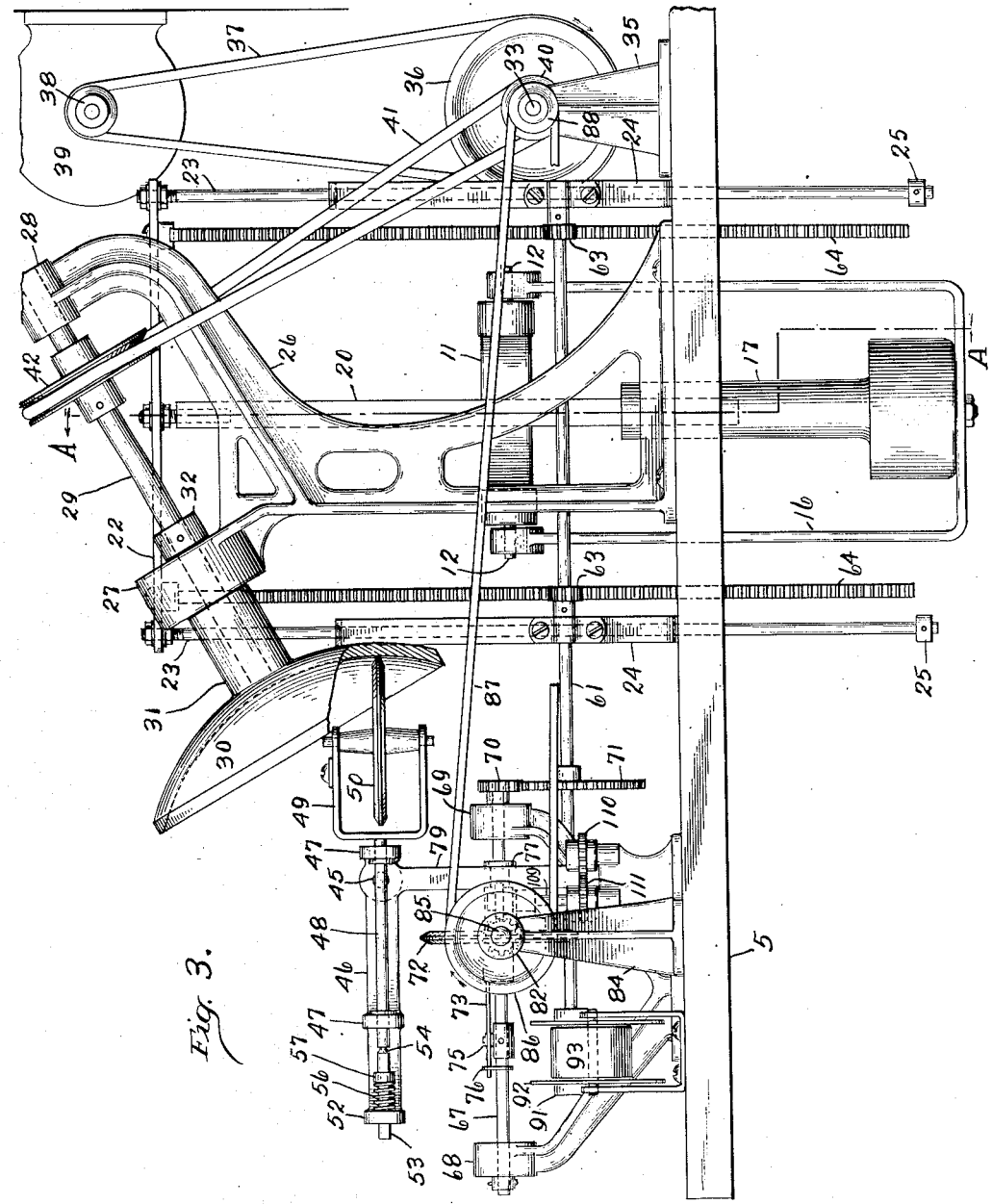

Fig. 3 an elevation of this mechanism looking from the bottom of Fig. 2.

Fig. 4 an elevation of this mechanism looking from the left hand end of Fig. 2.

Fig. 5 a vertical sectional view taken on the line A—A of Fig. 3, portions thereof being omitted to permit the desired showing of certain parts.

Fig. 6 a view of the power driven mechanism for controlling the scale counter-balancing means, said mechanism being therein shown in the neutral position.

Fig. 7 a view of the parts of Fig. 6 showing the said parts in the operating position.

Fig. 8 an enlarged sectional view of the controlling mechanism showing the manner of operating the controller wheel of the scale counter-balancing mechanism.

Fig. 9 an enlarged perspective view of the rack and pinion for operating the counter-balancing plunger and the means for holding the said rack and pinion in working relation.

Fig. 10 is a diagrammatic view of the electrically operated controlling means which prevents registering of the weight of the load except when the load is perfectly balanced.

Fig 11 is a detailed view of the terminal for closing the said electrical control means; and Fig. 12 is a sectional view of one of the levers whereby the electrical control means is operated.

1 is a scale beam such as is usually employed on weighing scales and is supported by means of the bracket 2 on the frame 3 of the weighing scale. This scale beam is connected on the weight side of its fulcrum by means of the usual rod 4 to the platform or other means whereon the weight is supported during the operation of weighing. Mounted on the weighing scale frame or otherwise supported a short distance below the scale beam 1 is a frame or platform 5 whereon is mounted and supported the automatic weighing mechanism of my device. This platform is cut away or provided with an opening 6 through which the rod 4 passes loosely and at a short distance therefrom and directly below the scale beam 1 is a bracket 7 mounted upon the platform 5 and provided with a pair of spaced aligning bearings 8 within which are supported the knife edge pivots 9 of the supplemental beam 10. This beam 10 is arranged parallel with the scale beam 1 and extends somewhat beyond the end thereof, and is formed at this outer or free end with a yoke 11, each arm of said yoke having a knife edge support 12. The end of the scale beam 1 is ordinarily provided with knife edge supports 13 to suspend weights from and I provide a corresponding pair of knife edge supports 14 on the supplemental beam 10, directly beneath the supports 13 on the scale beam, and these supports are connected by means of a link 15 which is provided at each end with a pair of suitable bearings or loops to loosely receive the said supports 13 and 14.

Suspended from the knife edge bearings 12 on the yoke 11 is a U shaped frame 16 which has the pot or tube 17 mounted thereon in a vertical position so that the upper end thereof is directly below the opening of the yoke 11. This pot or tube is filled to the required depth with mercury and co-operates with parts to be described hereafter for counter-balancing the weight of the load.

At the opposite end of the supplemental beam 10 from the yoke 11 is a threaded stem or extension 18 upon which is mounted an adjusting weight 19 whereby the parts of the automatic weighing mechanism connected with the scale beam may be brought to a perfect balance.

For the purpose of providing a variable pressure or weight on the scale beam 1 for counter-balancing the load, there is provided a glass rod or plunger 20, the lower end of which dips into the mercury 21 in the mercury pot and the upper end of which is secured to and supported by the cross bar 22. This cross bar 22 is provided at each end with a depending vertical rod 23 which passes through an opening at the upper end of the guide bar 24 and an opening at the lower end of the said guide bar adjacent the platform 5, whereon it is secured and supported, these said guide bars being so supported and connected with the guide rods 23 to permit free vertical movement thereof. The lower ends of the guide rods 23 may be provided with the collars 25 to prevent accidental withdrawal of the guide rods from their supports.

As is apparent, the movement of the plunger rod 20 beyond the normal depth in the mercury will act as the addition of so much weight to the mercury pot and is effective to counter-balance the load on the scale. Conversely, the withdrawal of the glass plunger 20 from the mercury acts in a manner to subtract weight from the mercury pot.

For the purpose of providing means which is sufficiently powerful to adjust the glass plunger 20 for counter-balancing the load and also which is capable of sensitive control by means of the movement of the scale beam, the following construction is provided which forms a very essential part of my invention.

Adjacent and immediately beyond the yoke end of the supplemental bar 10 and mounted on the platform is a bracket 26 provided at its upper portion with a pair of aligning bearings 27 and 28, which support the shaft 29 in a plane parallel to the guide rods 23 and at an angular relation to the platform 5 as shown in Fig. 3.

Secured on the lower end of the said shaft 29 is a concave disc 30, the shoulder 31 of which against the bearing 27 prevents longitudinal movement of the shaft in one direction and there is a collar 32 pinned on the shaft at the opposite side of the said bearing which prevents longitudinal movement of the shaft in the other direction.

Mounted on the platform 5 and at right angles to the plane of the shaft 29 is the shaft 33 which is supported in the bearings 34 and 35 secured to the platform 5. This shaft has the sheave 36 fixed thereon which is connected by means of the belt 37 to a sheave 38 of the motor 39 or any suitable power providing means, whereby the shaft 33 is driven. There is a sheave 40 secured to the shaft 33 which is connected by the belt 41 with a sheave 42 fixed on the shaft 29 whereby the said shaft and concave disc 30 thereon is continuously driven when the motor is in operation, the relation of the driving sheaves being determined so as to give the concave disc 30 the proper speed to properly operate the mechanism hereafter described.

Mounted upon the platform 5 in front of the rotary disc 30 is a bracket 43 which has at its upper end a pair of aligning bearings 44 in which is supported a shaft 45 and at the end of the said shaft immediately in front of the disc 30 is a frame 46 which, by reason of its support upon the shaft 45 is adapted to swing and the relation of the shaft 45 with the disc 30 is such that the axis of the shaft 45 passes through the center from which all points of the convex surface of the disc 30 are equi-distant. The frame 46 on the shaft 45 is elongated at right angles to the shaft and provided with the two aligning shaft bearings 47 within which is mounted the shaft 48. This shaft at its end adjacent the disc has a forked support 49 within which is mounted the disc or wheel 50, the edge of which is beveled as shown to provide a narrow periphery or bearing edge which engages the inner surface of the concave disc 30. It is necessary for the sensitive operation of the automatic weighing mechanism that the shaft 48 should turn freely within the bearings and to accomplish this the said bearings are provided with ball-bearings 51 as shown in Fig. 8 to engage the shaft. Beyond the reverse end of the shaft 48 from the wheel 50 to the frame 46 is provided with a lug 52 having an opening therethrough in alignment with shaft 48. An end thrust pin 53 which has a tapered end 54 engaging a small opening 55 in the end of the shaft 48 projects through the said opening in the lug 52 and there is a spring 56 confined by the lug 52 and an annular shoulder 57 on the thrust pin 53 whereby the said end thrust pin is held at a uniform tension against the end of the shaft 48 which tension is sufficient to act through the shaft 48 and support 49 to hold the wheel 50 in light frictional contact with the concave disc 30. The pivotal mounting of the frame 46 and shaft 45 permits swinging of the wheel 50 to and from the axis of the revolving disc 30, the relation of the pivotal supports 44 to the disc 30 being such that the wheel 50 swings in an arc concentric with the surface of the disc 30 and is at all times held in frictional engagement with the disc 30 by means of the end thrust pin 53.

As is apparent from the foregoing, the disc 30 is continuously driven by the motor 39 and the wheel 50 because of its constant frictional engagement with the inner surface of the disc 30 is likewise continuously driven. As long as the wheel 50 is in a position exactly at right angles to the plane passed through the axes of the shafts 29 and 48 the wheel 50 will remain constantly at the same distance from the axis of the revolving disk 30, and will mark a circular line on the inner surface of the disc. If, however, the wheel 50 is shifted in its pivotal supporting bearings 47 so that its position is not absolutely at right angles with the plane passed through the axes of the shafts 29 and 48, the revolution of the disc 30 will cause the wheel 50 to mark a spiral path on the inner face of the disc which will swing the said wheel 50 to or from the axis of the disc depending on the direction in which the wheel is tilted and this movement of the wheel will swing the frame 46 and shaft 45 in its pivotal support in the bearings 44.

The frame 49 and wheel thereon are mounted in ball bearings and the wheel 50 being of lesser diameter than the diameter of the concave surface of the disc 30 has a bearing on the said disc at a point which is on the axial line of the shaft 48 which enables the frame 49 and wheel thereon to be very easily tilted from the normal position and such tilting of this structure from the normal position, which has previously been explained causes the wheel 50 to approach nearer to or depart farther from the axis of the revolving disc 30, is utilized to operate the mechanism for adjusting the plunger rod 20 to a greater or lesser degree in the mercury pot and for balancing the load.

For controlling the tilting of the frame 49 and wheel, the end of the scale beam 1 is provided with a bar 58 which is clamped or otherwise secured to move therewith and this bar has a pendant rod 59 with a hook terminal at its lower end. Co-operating with this rod 59 is another rod 60 which is connected at one end to the tilting frame 49 and extends laterally from the pivotal axis of the tilting frame and is suitably bent and provided with a hooked terminal at its free end which rests or is supported in the hook rod 59, the relation of the said rods being such that when the scale beam is balanced the said rod 60 through its connection with the rod 59 holds the tilting frame 49 in the normal position, and in such position, as has been hereinbefore set out, the wheel 50 occupies a position at right angles to a plane passed through the axes of the shafts 29 and 48 and, therefore, as the disc 30 revolves follows a circular path on the inside of the disc 30 and remains at all times at the same distance from the axis of the disc. This holds the supporting frame in a stationary or inoperative position which is shown in Fig. 6.

If, however, the scale beam 1 moves to either side of its balanced position, the rod 59 will carry the rod 60 with it and cause a tilting of the frame 49 and wheel thereon which changes the relation of the wheel 50 to the plane through the axes of the shafts 29 and 48 and the revolution of the disc 30 causes the wheel 50 to mark a spiral path toward the center of the revolving disc or outwardly depending on the movement of the scale beam above its position of balance or below, as the case may be.

As is obvious, when the scale beam 1 is moved by the weight above its balanced position, it is necessary for the plunger rod 20 to be submerged to a greater depth in the mercury of the mercury pot 17 to provide additional pressure on the scale beam to balance the load and conversely, if the scale beam is moved below its balanced position, it is necessary for the plunger rod 20 to be withdrawn somewhat from the mercury. For this purpose, there is a shaft 61 which is journaled in the bearings 62 on the guide bars 24 parallel to and slightly above the platform 5 and there is a pinion 63 on said shaft 61 at the inner side and adjacent each of the bearings. Secured to the cross bar 22 are the racks 64 which depend therefrom in position to be engaged by the pinions 63, and extending downwardly substantially the length of the guide rods 2 and 3 so that the said pinions 63, by their engagement with the racks, are capable of raising and lowering the cross bar 22 and the plunger rod connected thereto. The racks 64 are held in meshing relation with the pinion 63 by idlers 65 bearing against the rear faces thereof and mounted to turn on the brackets 66 secured to the guide bars 24.

For operating the shaft 61 to adjust the plunger rod 20 there is a shaft 67 journaled in bearings 68 and 69 in parallel relation with the shaft 61 and provided with a spur gear 70 intermeshing with a spur gear 71 on the shaft 61, the said spur gears being preferably so related that the shaft 61 is operated at a considerably lower speed than the shaft 67. A disc 72 similar to the disc 50, previously described, having the edge beveled to provide a narrow bearing periphery is mounted to slide lengthwise on said shaft 67, but is keyed on to the shaft to turn therewith by means of the parallel rods 73 which are secured to the hub 74 and are parallel with the shaft and embraces a small roller 75 which is secured to the shaft 67 and extends radially therefrom. The outer ends of the rods 73 are held together by means of the disc 76 or otherwise as desired. This construction causes the disc 72 to turn with the shaft but permits the wheel being moved lengthwise with comparative ease. At the opposite side of the wheel 72 from the hub 74 is an extended hub member 77 provided with an annular groove 78 therein. (See Fig. 7.) Depending from the frame 46 is the lever 79 which has intermediate of its length an offset extension 80 (see Fig. 5) upon which is mounted a roller 81 which fits within the annular groove 78, so that the swinging of the lever 79 with the movement of the frame 46 causes the wheel 72 to slide longitudinally on the shaft 67, and the normal position of the wheel 72 is as shown in Fig. 6 when the wheel 50 is marking a circular path about the inner face of the disc 30.

When the wheel 50 is caused to follow a spiral path toward the center of the disc 30 the lever 79 draws the wheel 72 to the right of the normal position, as shown in Fig. 7 and when the wheel is tilted to move in an opposite direction on the disc 30 the lever moves the wheel 72 to the opposite side of its normal position.

Mounted in the bearings 82 and 83 of the bracket 84 which is secured to the platform 5 and at right angles to the shaft 67 is a shaft 85 whose axis intersects the axis of the shaft 67 and is in the same plane with the bearing edge of the wheel 72 in its normal position. This shaft has a sheave 86 fixed thereon which is driven by means of the belt 87 from the sheave 88 on the shaft 33 and there is a disc 89 on the end of the shaft 85 in position to have contact with the wheel 72 and this disc is held against the bearing edge of said wheel at a uniform pressure by means of the spring 90 which is compressed between the bearing 82 and the sheave 86.

It will be observed that this disc 89 is continuously driven when the automatic weighing mechanism is in operation and the wheel 72 normally bears against the center of the disc as will be noted by referring to Fig. 6 in which position it is stationary as no movement can, at that time, be imparted to it by the revolving disc 89. If, however, the wheel 72 is moved to one side or the other of the axis of the disc 89 by means of the lever 79 it will be caused to rotate by the revolving disc 89 and through its shaft and the gears 70 and 71, will cause the shaft 61 to operate and move the plunger rod 20 in the mercury pot. The movement of the wheel 72 from the normal inoperative position in either direction therefrom is controlled by the swinging frame 46 which in turn is controlled by the tilting of the parts 49 and 50 and these in turn are controlled by the connection thereof through the rods 59 and 60 and the bar 58 by the scale beam 1, their relation being such that when the scale beam is raised above the balanced position, the wheel 50 will be shifted to the operative position which will submerge the plunger rod 20 to a greater extent into the mercury 21, and conversely, when the scale beam is moved below the balanced position, the wheel 50 is shifted in the opposite direction so as to operate the shaft 61 and mechanism connected thereto, to raise the plunger rod from the mercury. In either case the movement of the plunger rod is accomplished in the direction required to balance the load and tends to return the scale to the balanced position and as the scale beam returns to the balanced position the tilting of the frame 49 is correspondingly varied by means of its connection with the scale beam through the rods 59 and 60 to return the wheel 50 to its normal position as shown in Fig. 6, in which the lever 79 holds the wheel 72 in the inoperative position, and all the parts co-operate in such a way that as the scale beam gradually nears its balanced position, the operation of the parts and the movement of the plunger rod 20 is gradually retarded and ceases as soon as the correct balance is obtained.

The degree to which the plunger rod 20 is submerged in the mercury cup determines the weight of the load on the scales and as this is adjusted by the movement of the shaft 61 and the pinions 63 thereon through their connection with the racks 64 the weight of the load can be determined by the amount of movement of the shaft 61 from the normal position. For the purpose of registering the weight of the load therefore I have indicated a registering mechanism or counter 91 which is operated by the movement of the shaft 61 to present figures which will indicate the correct weight of the load on the scales. I have not shown a detailed construction of this counter as it, in itself, forms no part of the present invention and any suitable or commonly known counter may be used which will accomplish this result. I prefer to equip this machine with a recording device whereby the weight as determined can be printed on a card or otherwise and for this purpose I provide the reels 92 which are adapted to carry an ordinary typewriter ribbon 93 over the face of the counter and there is a hammer 94 pivotally mounted in a bracket 95 on the platform 5 in such a position that it may be swung downwardly to cause the hammer face 96 to strike the typewriter ribbon directly above the proper reading of the counter. By placing a card or paper on the typewriter ribbon above the counter and depressing the hammer to strike there against, a printed reading of the determined weight may be secured.

It is further desired, in connection with this recording device, to provide means which will operate automatically to actuate the hammer to print the reading of the weight and also to control such means so that the hammer will not operate and the printed record of the weight cannot therefore be taken until and except when the scale beam is in the balanced position.

For this purpose I have provided a pivoted trip lever 97 adjacent the lower end of the hammer lever 94 and adapted normally to be held by means of the spring 98 in engagement with a notch 99 (see Fig. 10) in the lower end of the hammer lever 94, whereby the said lever is held in the raised position preparatory to striking the blow to print the record of the weight and the hammer lever 94 is provided with an arm 100 to which is connected a spring 101 suitably extended between the arm 100 and a hook 102 below the frame 5 so that when trip lever 97 is depressed out of engagement from the notch 99 of the hammer lever 94, the said hammer lever, by the tension of the spring 101 is caused to descend and strike a blow sufficient to print the record of the weight.

An electric control for the trip lever 97 is provided, consisting of a magnet 103 which is positioned to act upon the trip lever 97 by its magnetic action, there being provided a battery or other force of electric energy 104 in the circuit 105 whereby the magnet is energized. Mounted upon the frame 5 adjacent the lower end of the lever 79 is an insulated support 106, at each side of which, and insulated therefrom, are the spring contact members 107 each of which is connected in the circuit 105 so that when they are both placed against the central contact member 106 the circuit is closed and the magnet energized and such energizing of the magnet withdraws the trip lever 97 from its engagement in the notch 99 of the hammer lever 94 and permits the operation of the hammer lever by the tension of the spring 101.

Mounted upon the parallel vertical shafts 108 and 109 which are supported from an extended part of the bracket 84 are a pair of intermeshing spur gears 110 and 111 having hubs 112 (see Fig. 12) encircling the shaft there above and loosely mounted on the hubs 112 of these gears are the companion levers 113, the free ends of which embrace the upper free ends of the contact springs 107 as shown in Figures 10 and 11. The shaft 109 which supports the gear 111 and which is shown in Fig. 12 has the gear 111 secured thereon by means of the pin 114 or otherwise, and at the upper end of the said shaft is a gear 115 which meshes with a corresponding gear 116 on the constantly driven shaft 85 and imparts thereby a movement to the gears 110 and 111 which, through their loose frictional relation with the hubs of the lever 113 tend to swing the outer ends of the said levers together and compress the spring 107 therebetween to contact with the common contact member 106 and close the circuit.

To prevent such action and consequent closing of the circuit, except when the scale beam is balanced, the lower end of the lever 79 is positioned to swing between the extreme outer ends of the levers 113 and constructed so that the levers cannot approach and close the circuit, except when the lever 79 is at rest, exactly in the center or normal position. It will be recalled that any movement of the scale beam from the balanced position, tilts the frame and wheel 50 and causes a swinging of the frame 46 and shaft 45 and consequently a swinging movement of the lever 79 and it is impossible for the frame to come to rest until the scale beam is balanced and ceases to move the rods 59 and 60. The revolution of the gears 115 and 116 is timed so that the levers 113 swing more slowly than the lever 79 and consequently the swinging of the lever 79 keeps pushing the levers 113 away from their contact members and does not permit both of the levers to strike their contact spring simultaneously as required to close the circuit until the lever 79 has ceased to oscillate and comes to rest midway between the ends of the levers 113.

As soon as this lever comes to rest, the contact is automatically made, the trip lever 97 released by the closing of the circuit and energizing of the magnet 103 and the lever 94 strikes the blow to print the reading of the weight, as determined by the scale. After the load is removed the hammer lever 94 is raised and the mechanism is then in position to weight and record the next load.

While I have shown the controlling means herein in connection with a weighing scale, I contemplate using it in connection with any measuring device or for any purpose wherein a sensitive control of operating parts is required.

What I claim is:

1. In a measuring mechanism, the combination of adjustable means for determining the measurement, driven means for operating said adjustable means, a drive disc having a friction drive surface, a member pivoted adjacent the said friction surface, for controlling the said driven means, an idler wheel on the said pivoted member having a frictional engagement with the said rotary disc and controlling means for changing the position of the said idler so as to cause it to travel spirally on the face of the disc and thereby oscillate the pivoted member for controlling the said driven means.

2. The combination with measuring mechanism of adjusting means for determining the measurement, friction drive means for operating the said adjusting means, a driven concave disc, an oscillating member for controlling the said friction drive means, an idler on the said oscillating member having a frictional engagement with the concave surface of the said driven disc and means controlled by the measuring mechanism for varying the position of the idler, whereby it is operated by the rotary disc to oscillate the said member.

3. In combination, a scale beam, fluid controlled mechanism for counter-balancing the scale beam, and connected therewith, means for automatically adjusting said fluid control mechanism controlled by the movement of the scale beam, weight recording mechanism and means co-acting with said fluid control actuating means for operating said recording mechanism.

4. In a scale, in combination, a scale beam, fluid control means co-operating with said scale beam to counter-balance the latter, means under control of the scale beam for automatic adjustment of said fluid control means, to produce variable resistance against movement of the scale beam, including power means and connections operating said fluid control mechanism, and recording means co-acting with said actuating means for the fluid control mechanism.

5. In a scale, in combination, a scale beam, a fluid container, connected with the scale beam and a displacement member adjustable within the fluid in said container for counter-balancing the weight of the load, power driven means, recording mechanism, means connecting said recording mechanism with the power-operated member, and means actuated by the movement of the scale beam to cause the counter-balancing mechanism to function and the recording mechanism to be operated.

6. In a scale in combination, a scale beam, a receptacle adapted to contain a fluid, a displacement member connected with the scale beam and depending within the receptacle, a recording mechanism, a driven member, connections from the driven member connected respectively with said receptacle and the recording mechanism for operating the same, but normally inactive, and means actuated by the movement of the scale beam for causing said connecting mechanisms respectively to the displacement member and recording mechanism to be operated from the driven member.

In testimony whereof I have affixed my signature in presence of two witnesses:

FRANK HEBDEN.

Witnesses:
MARGARET M. WHITE,
E. M. GILES.